United States Patent
Wilcutt et al.

(10) Patent No.: US 9,446,644 B2
(45) Date of Patent: Sep. 20, 2016

(54) CONCENTRIC KNURL BALL JOINT

(75) Inventors: Michael Wilcutt, Birmingham, AL (US); George Phillips, Bremen, AL (US); Anthony Dake, Albertville, AL (US); Rickie Williams, Attalla, AL (US); Chris Shores, Grant, AL (US); Kennon Bret Swayer, Crossville, AL (US)

(73) Assignee: Federal-Mogul Corporation, Southfield, MI (US)

( * ) Notice: Subject to any disclaimer, the term of this patent is extended or adjusted under 35 U.S.C. 154(b) by 1219 days.

(21) Appl. No.: 12/630,357

(22) Filed: Dec. 3, 2009

(65) Prior Publication Data
US 2011/0135381 A1   Jun. 9, 2011

(51) Int. Cl.
*B62D 7/16* (2006.01)
*F16C 11/06* (2006.01)
*B60G 7/00* (2006.01)

(52) U.S. Cl.
CPC ........... *B60G 7/005* (2013.01); *F16C 11/0623* (2013.01); *B60G 2206/82092* (2013.01); *B60G 2206/91* (2013.01); *Y10T 29/4973* (2015.01); *Y10T 403/32631* (2015.01)

(58) Field of Classification Search
USPC ........ 403/76, 77, 133, 134, 135; 280/93.511
See application file for complete search history.

(56) References Cited

U.S. PATENT DOCUMENTS

| 2,848,260 | A |   | 8/1958 | Moskovitz |
| 3,177,020 | A | * | 4/1965 | Dumpis ................. 403/122 |
| 3,384,398 | A |   | 5/1968 | Wehner |

(Continued)

FOREIGN PATENT DOCUMENTS

| DE | 1287374 B | 1/1969 |
| EP | 2507079 A1 | 10/2012 |

(Continued)

OTHER PUBLICATIONS 80-84 Vanagon Lower Ball Joint Replacement; http://californiavan.conn/frontend/80-84lowerballjoints/, Aug. 25, 2009, pp. 1-5.

*Primary Examiner* — Michael P Ferguson
(74) *Attorney, Agent, or Firm* — Robert L. Stearns; Dickinson Wright, PLLC

(57) ABSTRACT

A replacement ball joint assembly (10) adapted to be pressed into a previously used and possibly distorted receiving hole (26) in a suspension component such as a control arm (28). A socket housing (12) of the assembly (10) includes a plurality of generally annular, concentric knurls (36) each having a respective crest portion (38) and separated one from another by intervening relief grooves (40). The crest portions (38) of the knurls (36) may be tapered so as to provide a lead-in feature to minimize misalignment during a press-in installation operation. The knurls (36) are preferably softer than the control arm material so that they yield during press-in rather than further disfiguring or enlarging the receiving hole (26). Displaced material from the crest portions (38) of the knurls (36) flows into the relief grooves (40).

17 Claims, 5 Drawing Sheets

(56) References Cited

U.S. PATENT DOCUMENTS

| | | | |
|---|---|---|---|
| 3,419,294 A * | 12/1968 | Ulderup | 403/134 |
| 4,256,413 A | 3/1981 | Abe | |
| 4,971,473 A * | 11/1990 | Schafer et al. | 403/135 |
| 5,649,779 A | 7/1997 | Martin et al. | |
| 5,904,436 A | 5/1999 | Maughan et al. | |
| 6,152,637 A | 11/2000 | Maughan | |
| 6,505,989 B1 | 1/2003 | Pazdirek et al. | |
| 7,028,699 B2 | 4/2006 | Lee | |
| 2005/0132769 A1 | 6/2005 | Parker | |
| 2006/0140711 A1 | 6/2006 | Morales Arnaez | |
| 2007/0048081 A1 | 3/2007 | Elterman et al. | |

FOREIGN PATENT DOCUMENTS

| | | |
|---|---|---|
| GB | 2026085 A | 1/1980 |
| JP | S5382957 A | 7/1978 |
| JP | 1145414 A | 6/1989 |
| JP | 1312218 A | 12/1989 |
| JP | 2004286161 A | 10/2004 |

* cited by examiner

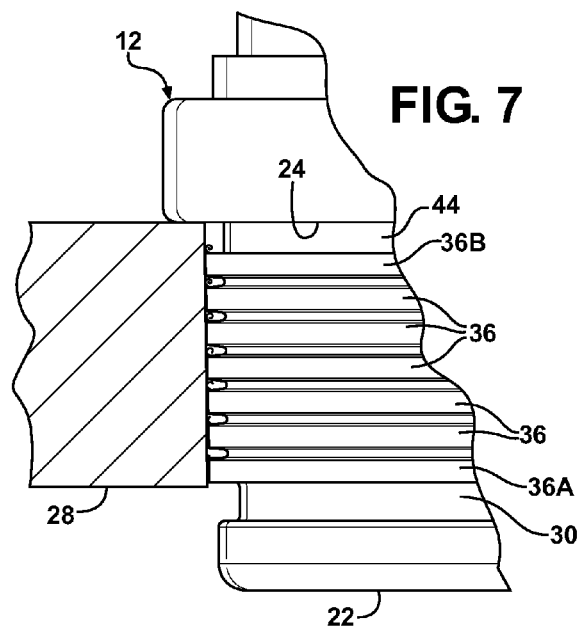
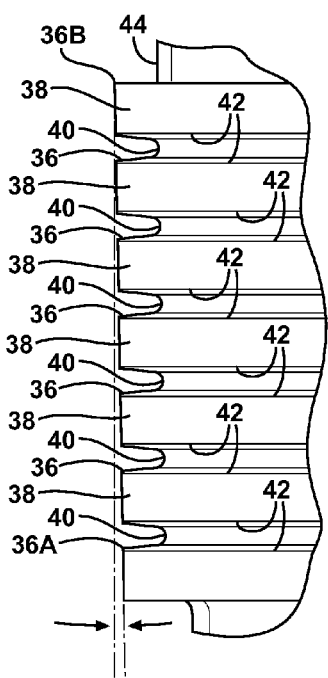
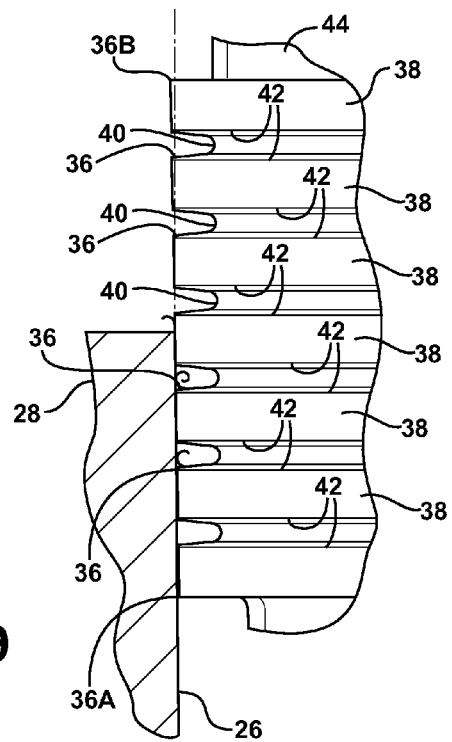

CONCENTRIC KNURL BALL JOINT

CROSS REFERENCE TO RELATED APPLICATIONS

None.

BACKGROUND OF THE INVENTION

1. Field of the Invention

This invention relates to a press-fit type ball joint the type used in automobile and light truck applications, and more particularly toward a replacement ball joint assembly adapted to be pressed into a previously used and possibly distorted receiving hole in a suspension component.

2. Related Art

Suspension systems in many automobiles and light trucks include several ball joint assemblies to provide a pivoting, swiveling connection with the wheels. Ball joints typically comprise spherical bearings connecting upper and/or lower control arms to the respective steering knuckles, like that shown in FIG. 1. Such assemblies have a limited life span and require replacement when indications of wear present. It is not uncommon to replace a ball joint assembly numerous times over the service life of a typical automobile or light truck.

Ball joint assemblies usually have a socket housing that is mounted in a receiving hole in one of the control arms. These socket housings can be mounted using various techniques such as by direct threaded engagement, taper fit with a threaded nut keeper, spot welding, or by press-fit. Press-fit ball joint assemblies are held in place by a tight interference fit between an exterior socket housing and the inner receiving hole in the control arm. Knurls on the socket housing improve retention. Frequently, a snap ring is used to backup the press-fit connection to assure the socket housing does not inadvertently disconnect.

Replacement ball joint assemblies, i.e., ball joint assemblies provided as repair parts rather than original equipment components, are often designed with oversized knurls in the form of longitudinally extending splines so as to assure a tight interface with the receiving hole in the control arm. An example of this type is shown, for example, in FIG. 3. A C-frame press tool, like that shown in FIG. 2, may be used to remove the old, worn ball joint assembly and install a new, replacement ball joint assembly according to well known procedures. These procedures may include use of a sleeve-type receiving tube and cup-like adapter like those illustrated in FIG. 2.

A particular problem experienced by mechanics and others involved in the automobile repair trade involves the replacement of a press-fit type ball joint into a control arm having a worn and/or disfigured receiving hole. For example, if a particular vehicle has experienced multiple previous ball joint assembly replacement operations, it is likely that the receiving hole in the control arm will have become distorted and enlarged, and possibly also work-hardened by the numerous previous ball joint replacement operations. In these cases, it may be recommended to replace the entire control arm that is only deficient due to a worn and over-expanded receiving hole. As will be appreciated, this can result in increased repair costs, unnecessary waste, and consumer dissatisfaction. Accordingly, there is a need in the art to address situations where a replacement ball joint assembly of the press-fit type is required to be installed in a previously used and possibly distorted receiving hole in a vehicular suspension component. Furthermore, there is a need to prevent further distortion of a receiving hole to thereby extend the useful life of control arms and other such suspension components.

SUMMARY OF THE INVENTION

This invention relates to an assembly and method for replacing a ball joint assembly of the press-fit type into a previously used and possibly distorted receiving hole in a vehicular suspension component. The ball joint assembly comprises a socket housing defining a central axis. The socket housing includes an exterior side wall having a lead-in end and an axially spaced exterior stop flange. A moveable member having a ball head portion is pivotally captured in the socket housing and further includes a mounting shaft extending generally axially from the ball head portion. The exterior side wall of the housing includes a plurality of generally annular knurls each having a respective crest portion establishing its outer diameter. The knurls are axially separated one from another by intervening relief grooves. Each knurl is disposed concentrically about the central axis. At least the first knurl adjacent the lead-in end has a smaller outer diameter than the last knurl adjacent the stop flange. A replacement ball joint assembly constructed according to these specifications is particularly well suited to achieving a secure press-fit connection in a previously used and possibly distorted receiving hole in a vehicular suspension component.

According to another aspect of this invention, a method is provided for replacing a ball joint assembly in a vehicular suspension component comprising the steps of: providing a vehicular suspension component having a worn-out ball joint lodged in a receiving hole and then removing the worn-out ball joint from the suspension component to expose the receiving hole therein. The method further includes providing a replacement ball joint assembly having an exterior side wall with a lead-in end and an axially spaced exterior stop flange. A plurality of generally annular knurls are formed about the exterior side wall, each knurl having a crest portion establishing an outer diameter thereof. The knurl forming step further includes reducing the outer diameter of the first knurl adjacent the lead-in end relative to the outer diameter of the last knurl adjacent the stop flange. Each knurl is separated from the next adjacent knurl by an intervening relief groove. The method includes forcibly pressing the replacement ball joint into the exposed receiving hole in the suspension component while simultaneously displacing crest material from at least one of the knurls into an immediately adjacent relief groove in response to attrition with the receiving hole.

The subject invention overcomes the shortcomings and disadvantages inherent in prior art press-fit ball joint assemblies. The concentric orientation of the knurls, together with the intervening relief grooves, work in concert to diminish further distortion of the receiving hole in the suspension component while simultaneously preventing the undesirable buildup of displaced material under the stop flange, thereby minimizing stress and receiving hole distortion during installation.

BRIEF DESCRIPTION OF THE DRAWINGS

These and other features and advantages of the present invention will become more readily appreciated when considered in connection with the following detailed description and appended drawings, wherein:

FIG. 1 is an exemplary, fragmentary view of a vehicular wheel and its associated suspension components including an upper control arm, lower control arm and steering knuckle, with press-fit style ball joint assemblies disposed there between;

FIG. 7 is a view as in FIG. 6 showing a still further advancement with the ball joint assembly in a fully seated condition;

FIG. 8 is an enlarged, fragmentary view of a portion of the exterior side wall of the socket housing illustrating a tapered, lead-in angle formed by the crests of the respective knurls in one embodiment of the invention; and FIG. 9 is another enlarged view showing the forcible pressing of a replacement ball joint assembly into an exposed receiving hole in a suspension component whereby crest material from the relatively soft knurls is displaced into the relief grooves in response to attrition with the receiving hole, whereby damage to the inside diameter of the receiving hole is minimized.

DETAILED DESCRIPTION OF THE PREFERRED EMBODIMENT

Figure 4:
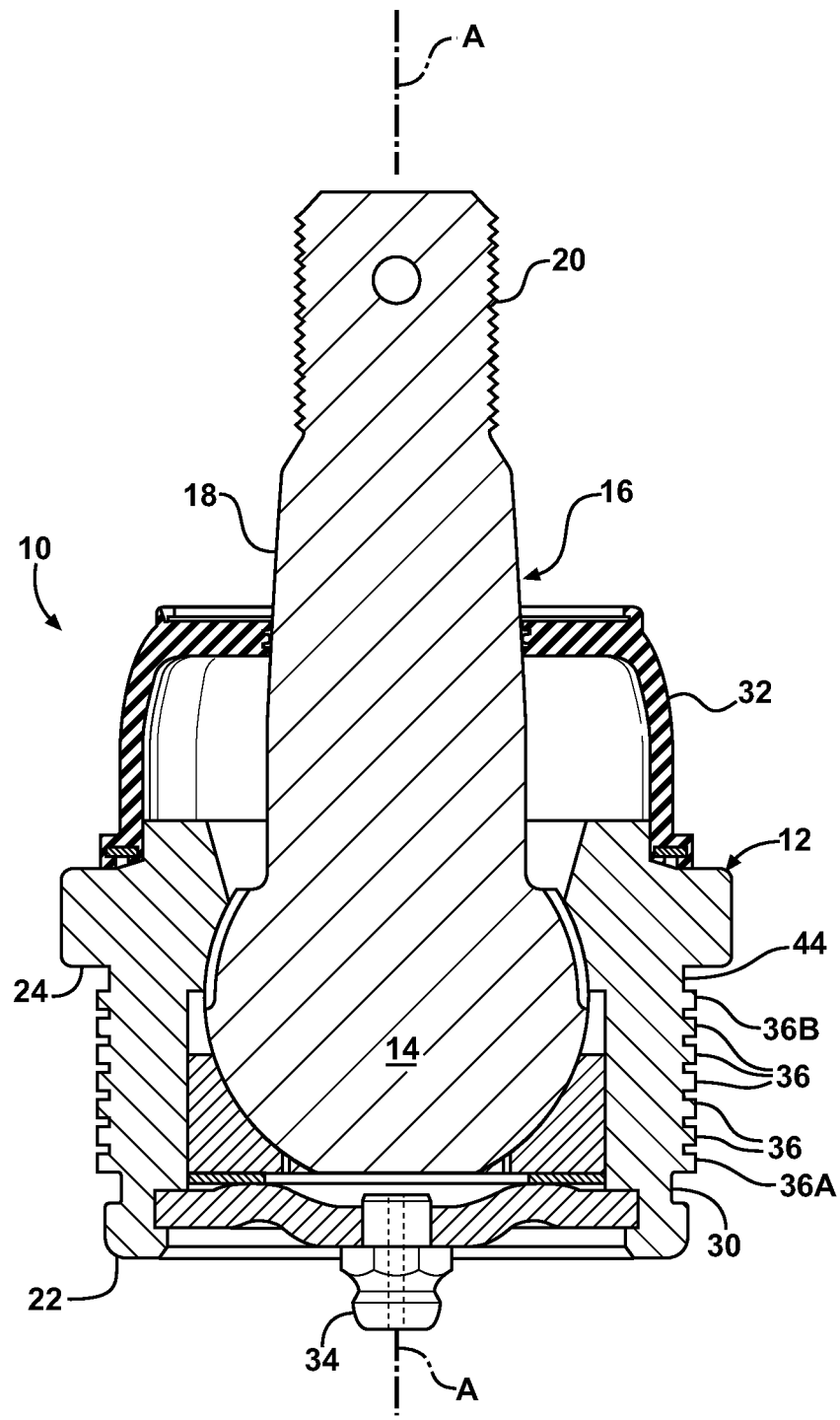
FIG. 4 is a cross-sectional view of a replacement ball joint assembly according to the subject invention.

Referring to the Figures, wherein like numerals indicate like or corresponding parts throughout the several views, a replacement ball joint assembly according to the subject invention is generally shown at 10 in FIG. 4. The assembly 10 includes a cup-like socket housing 12, preferably formed from a metal such as steel, in which is captured the articulating ball head portion 14 of a ball stud 16, also preferably formed from steel or other suitable material. The ball stud 16 includes a mounting shaft 18 that extends integrally away from the ball head portion 14, outwardly from the socket housing 12. The mounting shaft 18 may have a tapered connection surface and a threaded end 20, although the specific shapes and attachment techniques for the mounting shaft 18 may vary from one application to the next.

The socket housing 12 defines a central axis A, and includes an exterior side wall having a lead-in end 22 and an axially spaced exterior stop flange 24. In practice, the lead-in end 22 is inserted first into a receiving hole 26 in a suspension component 28, as viewed in FIGS. 5 and 6. During a press-fit operation, the socket housing 12 is forced, such as through application of the screw of a C-frame tool, until the stop flange 24 abuts the suspension component 28 in surface-to-surface contact as shown in FIG. 7. The socket housing 12 may include a ring groove 30 for receiving a snap ring or other type of supplemental retention device once the assembly 10 has been seated in the suspension component 28.

A dust boot 32 may be employed, as needed, to provide an enclosure to seal the socket housing 12 from external contaminants as well as to retain the lubricant or grease at the articulating interface with the ball head portion. The assembly 10 is adapted to receive grease or other lubricant through a grease fitting 34.

Turning now to FIGS. 5-9, the socket housing 12 is shown in enlarged detail to better illustrate the exterior side wall of the socket housing 12. The portion of the exterior side wall between its lead-in end 22 and stop flange 24 is configured with a plurality of generally annular knurls 36. Each knurl 36 has a crest portion 38 which establishes its respective outer diameter. The knurls 36 are axially separated from one another by intervening relief grooves 40. As perhaps best shown in FIGS. 8 and 9, flanks 42 of each knurl 36 extend almost radially to interconnect each side of its crest 38 to an adjacent relief groove 40. A back-up relief groove 44 is disposed between the last knurl 36B and the stop flange 24.

The knurls 36 are preferably formed in a machining operation so as to minimize the effects of work-hardening, thereby maintaining the material hardness of the knurls 36 in the softest possible condition. Furthermore, the knurls 36 are formed so that the first knurl 36A adjacent the lead-in end 22 has a smaller outer diameter than the last knurl 36B adjacent the stop flange 24. The smaller first knurl 36A is designed, relative to the receiving hole 26 in the suspension component 28 to provide a piloting or lead-in feature to help center the ball joint assembly 10 during installation and thereby prevent inadvertent misalignment or damage to the suspension component 28. Preferably, this relative sizing results in a repair scenario in which pressing of the ball joint assembly 10 into the suspension component 28 experiences an interference fit between at least the last knurl 36B and the receiving hole 26 but not between the crest of the first knurl 36A and the receiving hole 26. In one preferred embodiment, the crests 38 of all the knurls 36 are aligned with a frusto-conical taper like that illustrated in FIG. 8, wherein the broken line represents a cylinder equivalent in diameter to the last knowl 36B. The broken line in FIG. 9 represents the theoretical cylindrical edge of a receiving hole 26, and highlights the manner in which the degree of interference between the crests 38 and the receiving hole 26 increases in the direction of the last knurl 36B. In an alternative configuration, all of the crests 38 may have a true cylindrical exterior configuration but merely stepped diameters providing similar functionality. In yet another variation, only the first two or three knurls 36A, 36 are formed with a tapered lead-in configuration on their crests 38, whereas the remaining knurls 36 leading up to the last knurl 36B are each formed with a proper cylindrical configuration. Of course, many other variations are possible without departing from the spirit of this invention.

Referring again to FIGS. 8 and 9, it can be observed that each knurl 26 has an axial width while each relief groove 40 has an axial span. The dimensional relationships between the knurls 36 and grooves 40 is such, in one exemplary embodiment, that the axial width of each knurl 36 is greater than the axial span of each relief groove directly adjacent thereto by approximately 50%. A configuration like that depicted here provides an advantageous blend of installation convenience, holding power and alignment functionality without the shortcomings found in prior art designs like that of FIG. 3. More specifically, the relief grooves 40, 44 backing each respective knurl 36 allow for displaced crest material (evident from the curls illustrated in FIGS. 7 and 9) to flow during the installation process. Traditional axial knurl designs like that of FIG. 3 do not allow for this flow of material and, as a result, cause a buildup of displaced material which can accumulate under the stop flange of the housing, thereby creating a buildup of pressure during installation. This shortcoming is avoided by the subject invention where such displaced crest material flows directly into an adjacent relief groove 40, 44 without the undesirable buildup of stress and pressure. As a result, the inside diameter of the receiving hole 26 is better preserved, thereby enabling the possibility of future repair or replacement operations.

Figure 5:
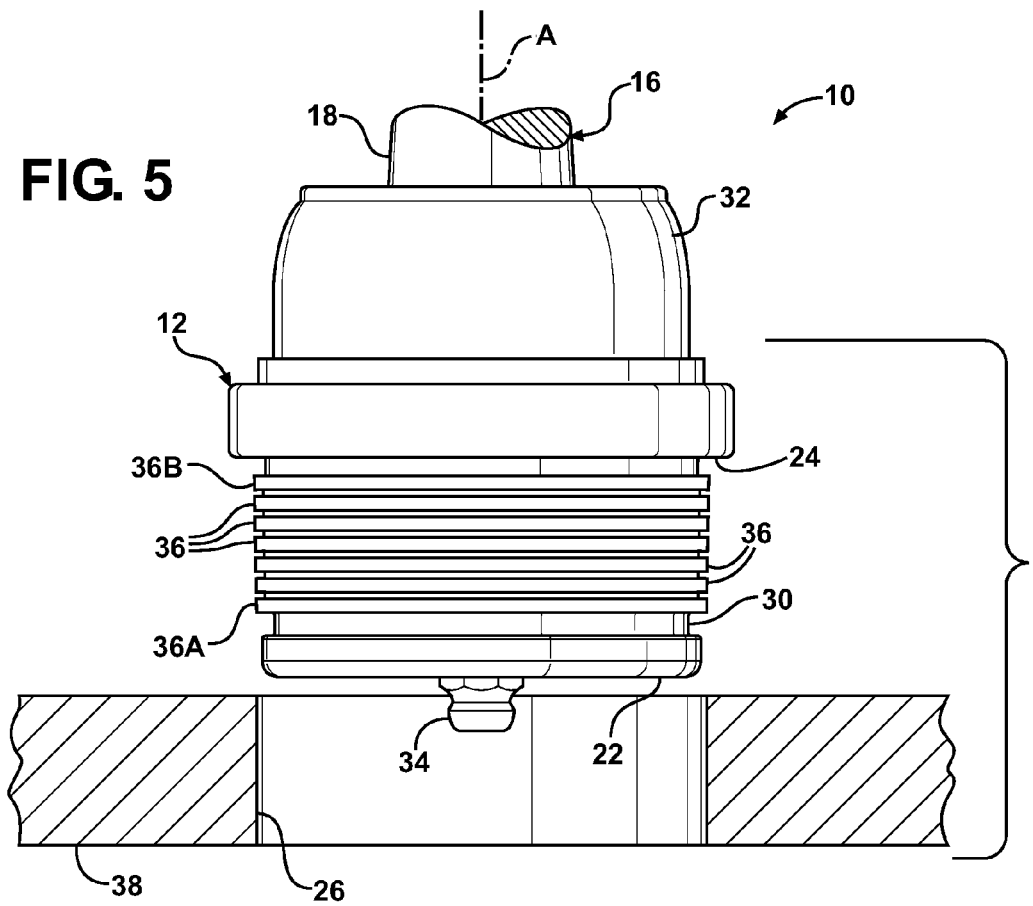
FIG. 5 is a fragmentary elevation showing a replacement ball joint assembly according to the subject invention poised for insertion into a receiving hole in a suspension component.
Figure 6:
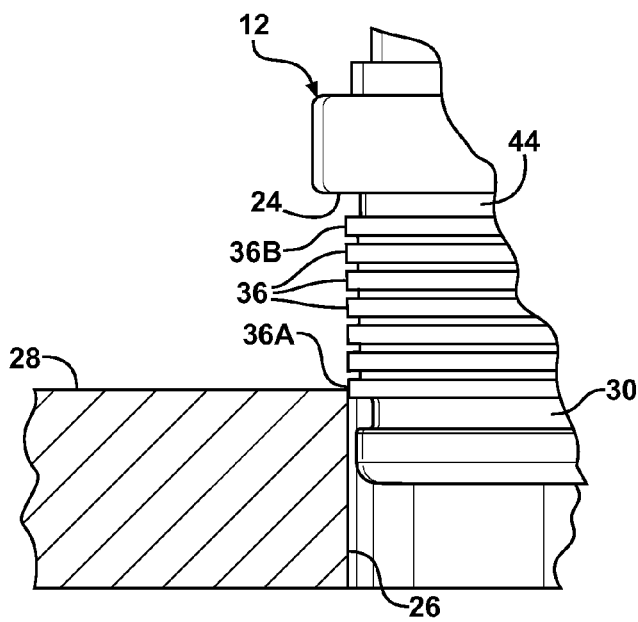
FIG. 6 is a fragmentary view like that in FIG. 5 but further advanced to depict the first knurl adjacent the lead-in end of the socket housing serving as a pilot feature to reduce the tendency for misalignment.

As shown in FIG. 5, the knurls 36 are preferably substantially annular and discrete. However, those of skill in the art will appreciate that in an alternative configuration the knurls 36 could be cut in a thread-like pattern resulting in something of an Acme-style thread pattern while still maintaining other relationships and attributes as described above. Such an alternative configuration would result in generally annular knurls instead of the substantially annular knurls depicted in the drawings.

Figure 1:
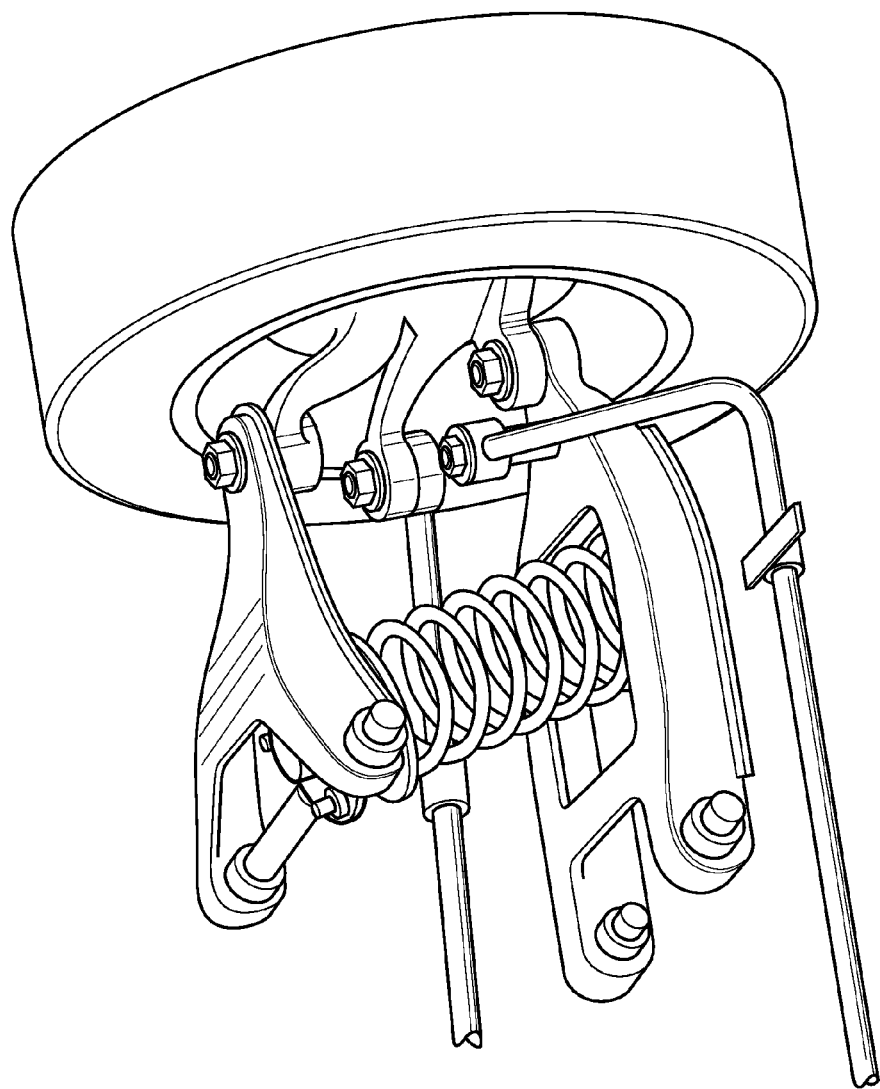
Figure 3:
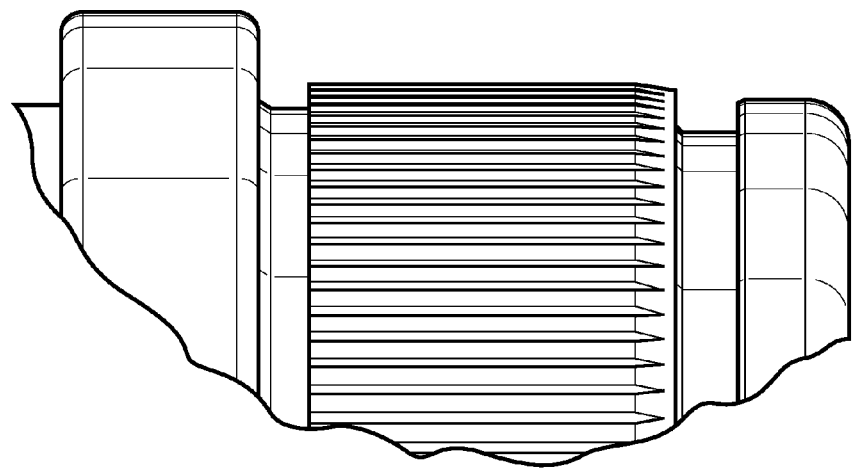
FIG. 3 is an enlarged view of a prior art socket housing enlarged from the area circumscribed at 3 in FIG. 2 and showing the traditional axial, spline-like knurls.
Figure 2:
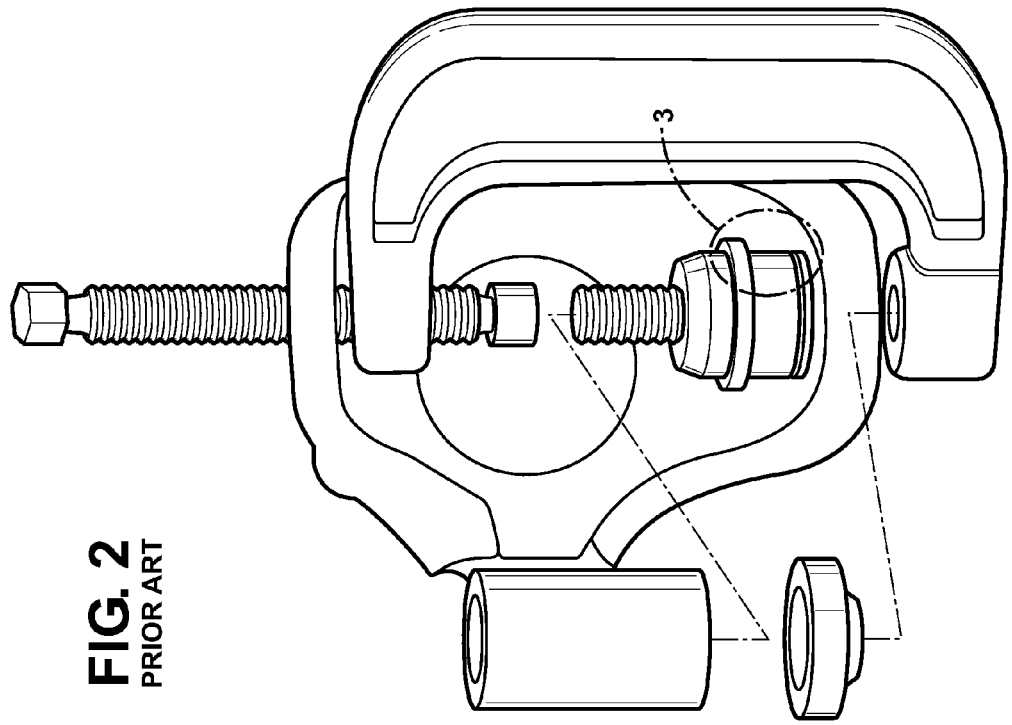
FIG. 2 is an exemplary view of a press-fit ball joint assembly being installed into a lower control arm using a C-frame press tool, installation sleeve and adapter.

As alluded to previously, the knurls 36 and associated relief grooves 40 are preferably machined into the metallic socket housing 12 using conventional machine techniques. In other words, material may be removed from the socket housing 12 with a cutting tool. This compares to traditional processes which require high pressure forging to unseat the material and form the spline-like knurls as shown in FIG. 3. Machining, on the other hand, provides for much better process control and less wear on the machine tools. The design furthermore improves the installation of the ball joint assembly 10 by a mechanic. Such installation improvements are attributed to the formation of the lead-in taper on the first knurl 36 and possibly on additional knurls 36 as well so that the socket housing 12 can be received at least initially into the receiving hole 26 in the correct orientation. In addition, the latter concentric knurls 36, 36B are designed to wipe away during installation, thereby preserving the inside diameter of the mating receiving hole 26 instead of damaging the receiving hole like in traditional axial knurl designs.

The generous relief grooves 40 provide space for displaced crest material to flow into during the press-in process. This avoids the problems associated with traditional knurl designs (FIG. 3) which incubate a build-up of displaced material under the stop flange of the housing, thereby causing undesirable stress concentrating as well as further damage/distortion to the receiving hole 26.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention is defined by the following claims.

What is claimed is:

1. A vehicular suspension assembly comprising:
 a vehicle suspension component having a receiving hole which is generally cylindrical in shape;
 a socket housing defining a central axis, said socket housing including an annular exterior side wall having a lead-in end and an axially spaced exterior stop flange;
 a moveable member having a ball head portion pivotally captured in said socket housing and a mounting shaft extending generally axially therefrom;
 said exterior side wall of said housing further including a plurality of generally annular knurls each having a respective crest portion establishing an outer diameter, said plurality of knurls being axially separated one from another by intervening relief grooves, each of said knurls disposed concentrically about said central axis; and
 a plurality of said knurls adjacent said lead-in end having a smaller outer diameter than a last said knurl adjacent said stop flange, wherein said plurality of knurls adjacent said lead-in end taper towards said lead-in end;
 the outer diameter of at least one of said plurality of knurls adjacent said lead-in end being smaller than said diameter of said receiving hole in said suspension component while the outer diameter of said last knurl is larger than said diameter of said receiving hole whereby pressing of said ball joint assembly into said suspension component creates an interference fit between at least said crest of said last knurl and said receiving hole but not between said crest of at least one of said plurality of knurls adjacent said lead-in end and said receiving hole.

2. The assembly of claim 1 wherein each of said plurality of knurls adjacent said lead-in end has a frustoconically tapered crest portion.

3. The assembly of claim 1 wherein said last knurl adjacent said stop flange has a true cylindrical crest portion.

4. The assembly of claim 1 wherein each said knurl has an axial width and each said relief groove has an axial span; the axial width of each said knurl being greater than the axial span of each said relief groove directly adjacent thereto.

5. The assembly of claim 1 wherein each said knurl is substantially annular.

6. The assembly of claim 1 wherein said knurls each include machined flanks interconnecting said respective crest portions with a directly adjacent said relief groove.

7. The assembly of claim 1 further including a back-up relief groove disposed between said last knurl and said stop flange.

8. The assembly of claim 1 wherein said receiving hole of said vehicle suspension component is used.

9. The assembly of claim 8 wherein said used receiving hole is distorted.

10. A replacement ball joint assembly adapted to be pressed into a receiving hole in a vehicle suspension component, said assembly comprising:
 a vehicle suspension component including a receiving hole having a generally cylindrical shape with a generally constant internal diameter;
 a socket housing defining a central axis, said socket housing including an annular exterior side wall having a lead-in end and an axially spaced exterior stop flange;
 a moveable member having a ball head portion pivotally captured in said socket housing and a mounting shaft extending generally axially therefrom;
 said exterior side wall of said housing further including a plurality of generally annular knurls each having a respective crest portion establishing an outer diameter, said plurality of knurls being axially separated one from another by intervening relief grooves, each of said knurls disposed concentrically about said central axis;
 a plurality of said knurls adjacent said lead-in end having a smaller outer diameter than a last said knurl adjacent said stop flange, wherein each of said plurality of knurls adjacent said lead-in end has a frustoconically tapered crest portion and said plurality of knurls adjacent said lead-in end taper towards said lead-in end;
 the outer diameter of said plurality of knurls adjacent said lead-in end being smaller than said diameter of said receiving hole in said suspension component while the outer diameter of said last knurl is larger than said diameter of said receiving hole whereby pressing of said ball joint assembly into said suspension component creates an interference fit between at least said crest of said last knurl and said receiving hole but not between said crest of said plurality of knurls adjacent said lead-in end and said receiving hole.

11. The assembly of claim 10 wherein said last knurl adjacent said stop flange has a true cylindrical crest portion.

12. The assembly of claim 10 wherein each said knurl has an axial width and each said relief groove has an axial span; the axial width of each said knurl being greater than the axial span of each said relief groove directly adjacent thereto.

13. The assembly of claim 10 wherein each said knurl is substantially annular.

14. The assembly of claim 10 wherein said knurls each include machined flanks interconnecting said respective crest portions with a directly adjacent said relief groove.

15. The assembly of claim 10 wherein said suspension member is fabricated from a material having a definable material hardness, and said socket housing is fabricated from a material having a different material hardness which is softer than the material hardness of said suspension member.

16. The assembly of claim 10 wherein said receiving hole of said vehicle suspension component is used.

17. The assembly of claim 16 wherein said used receiving hole is distorted.

* * * * *